United States Patent [19]

Hinkle

[11] 4,028,892
[45] June 14, 1977

[54] TURBOCHARGED TWO-CYCLE ENGINE WITH POSITIVE BLOWER AND INTERNALLY MOUNTED AFTERCOOLER

[75] Inventor: Stanley J. Hinkle, Union Lake, Mich.

[73] Assignee: General Motors Corporation, Detroit, Mich.

[22] Filed: Jan. 10, 1975

[21] Appl. No.: 540,122

Related U.S. Application Data

[63] Continuation-in-part of Ser. No. 504,089, Sept. 9, 1974, abandoned.

[52] U.S. Cl. .......................... 60/599; 123/119 CD; 123/65 BA
[51] Int. Cl.² .................. F02B 29/04; F02B 33/38; F02B 75/02
[58] Field of Search ... 123/119 CD, 65 BA, 119 CB, 123/119 C; 60/599, 604

[56] References Cited

UNITED STATES PATENTS

| | | | |
|---|---|---|---|
| 2,126,376 | 8/1938 | Curtis | 123/65 VC |
| 2,346,463 | 4/1944 | Szekely | 123/119 CD |
| 2,739,440 | 3/1956 | Seifert et al. | 123/119 C |
| 2,844,133 | 7/1958 | Thompson | 123/119 C |
| 2,963,006 | 12/1960 | Karde | 123/65 BA |
| 3,257,797 | 6/1966 | Lieberherr | 60/599 |
| 3,450,109 | 6/1969 | Gratzmuller | 123/119 CD |
| 3,581,722 | 6/1971 | McKellar | 123/122 D |
| 3,881,455 | 5/1975 | Belsanti | 123/119 CD |
| 3,901,200 | 8/1975 | Zaruba et al. | 123/41.73 |

Primary Examiner—Carlton R. Croyle
Assistant Examiner—Thomas I. Ross
Attorney, Agent, or Firm—Robert J. Outland

[57] ABSTRACT

Improved engine performance and reduced temperatures of combustion and engine components giving lower NO exhaust emission results when a turbocharged Roots blown two-cycle diesel engine is provided with a flow restricting aftercooler between the positive displacement Roots blower and the engine cylinders. A preferred arrangement for a V-type engine mounts the after cooler in the engine cylinder block within the air box space between the cylinders and beneath the cylinder block-mounted Roots blower for a compact arrangement with simple connections to the engine coolant jacket and minimum changes to engine airflow. High velocity airflow in the cooler and scrubbing of the cooled air box lower wall provide good cooling efficiency as well as avoiding plugging of cooler air passages with carbon and other airborne particles.

1 Claim, 5 Drawing Figures

TURBOCHARGED TWO-CYCLE ENGINE WITH POSITIVE BLOWER AND INTERNALLY MOUNTED AFTERCOOLER

CROSS REFERENCE TO RELATED APPLICATION

This application is a Continuation-In-Part of U.S. patent application Ser. No. 504,089, now abandoned, filed Sept. 9, 1974, in the name of Stanley J. Hinkle, and assigned to the assignee of this application.

BACKGROUND OF THE INVENTION

This invention relates to internal combustion engines and more particularly to two-cycle diesel engines wherein a positive displacement blower provides scavenging and charging air to the cylinders and an exhaust driven turbochargers is used to pressurize the air delivered to the blower, thereby increasing charge density in the cylinders for high output operation.

It is known in the art to provide a two-cycle diesel engine with a positive displacement charging pump such as a Roots blower for delivering air to an engine air box connecting with cylinder air inlet ports to positively scavenge and charge the cylinders. It is further known to increase the maximum output capability of such engines by providing an exhaust driven turbocharger arranged to deliver pressurized air to the inlet of the Roots blower during engine operation at sufficiently high loads. The operation of such air supply systems yields relatively high charging air temperatures which result in high cylinder combustion and engine components temperatures.

In some such engines these temperatures have been reduced by providing an aftercooling heat exchanger between the turbocharger and the cylinders to remove some of the heat of compression from the charging air. Such arrangements have the further advantage of increasing the cylinder charge density, thereby permitting increased power output to be obtained from the engine.

However, in engines incorporating positive displacement charging pumps, such as the pistons of four-cycle engines or the rotary blower of some two-cycle engines, cooling of the pump inlet results in increasing the mass of air pumped through the engine. The additional airflow combined with the added restriction of the cooler in the system tends to increase system pumping losses while at the same time the turbocompressor operating line moves into a less efficient operating range under the increased flow conditions.

A published report in SAE Transactions, Volume 67, 1959, pages 411–412 indicates some consideration has been given to the inherent cooling capacity of the water cooled air box walls of a two-cycle diesel engine. In addition, the use of finned water tubes in the air box to obtain further cooling has been tried with limited success. However, it has been considered that such devices would be rendered less effective in time due to sludging or collection of carbon and other deposits which would plug cooling devices located in the air box environment.

SUMMARY OF THE INVENTION

I have discovered that in two-cycle engines where a positive displacement blower is used and a turbocharger feeds pressurized air to the positive displacement blower, substantial operating improvements may be made by locating an aftercooler between the positive displacement blower and the engine cylinders in a position such that it provides some restriction to airflow.

With this arrangement, the inlet of the positive displacement blower is not cooled, and thus the mass of air-flow through the engine is not increased. Rather, mass flow is reduced, particularly at high engine speeds and loads, due to the restrictive effect of the cooler located at the blower circuit. The reduced flow results in lower pumping losses and also moves the compressor operating line at high flows to a more efficient operating range closer to the surge line.

Additionally, rejection by the aftercooler of some of the heat added to the charging air by the positive displacement blower results in lower cylinder temperatures than when further pumping occurs after cooling. Thus, the mass of air trapped in the cylinders is further increased and engine component temperatures are reduced. Combustion temperatures are also reduced, giving substantial reductions in the formation of oxides of nitrogen in the combustion process.

The results of the present invention thus include a capability of increased power output through an increase in trapped cylinder air, improved fuel economy resulting from reduced losses and better operating efficiency, lower component temperatures and reduced emissions of nitrogen oxides in the exhaust gases.

In addition, with placement of the aftercooler at the outlet of the positive displacement blower and sizing of the airflow passages to slightly restrict flow, the air-flow velocity in the cooler is sufficiently high to keep the passages free of carbon or other deposits as well as provide high heat transfer rates and cooling efficiency which are necessary to fully realize the benefits of after-cooling.

Accordingly, it is an object of this invention to provide a two-cycle diesel engine of the type having a positive displacement blower to provide scavenging air to the engine cylinders and a turbocharger with a dynamic compressor supplying pressurized air to the positive displacement blower with an aftercooler arranged at the blower outlet in the airflow path between the positive displacement blower and the engine cylinders.

Another object of the invention is to provide a compact and efficient arrangement for a V-type two-cycle diesel engine arranged according to the invention.

These objects of the invention are obtained in a preferred embodiment wherein an aftercooler heat exchanger is mounted within the engine air box between the cylinder banks and within the cylinder block of a V-type two-cycle aftercooled Roots blown engine. In this arrangement, the aftercooler receives air from the Roots blower, which is mounted on the cylinder block directly above the cooler. Air from the cooler is delivered directly into the engine air box and mounting of the cooler therein reduces the need for protective housings around the cooler. In addition, simple connections are made with the engine cooling jacket within the engine to provide a flow of coolant through the heat exchanger for cooling the inlet air.

These and other features and advantages of the invention will be more fully understood from the following description of a preferred embodiment, taken together with the accompanying drawings.

DESCRIPTION OF THE ILLUSTRATED EMBODIMENT

Figure 1:
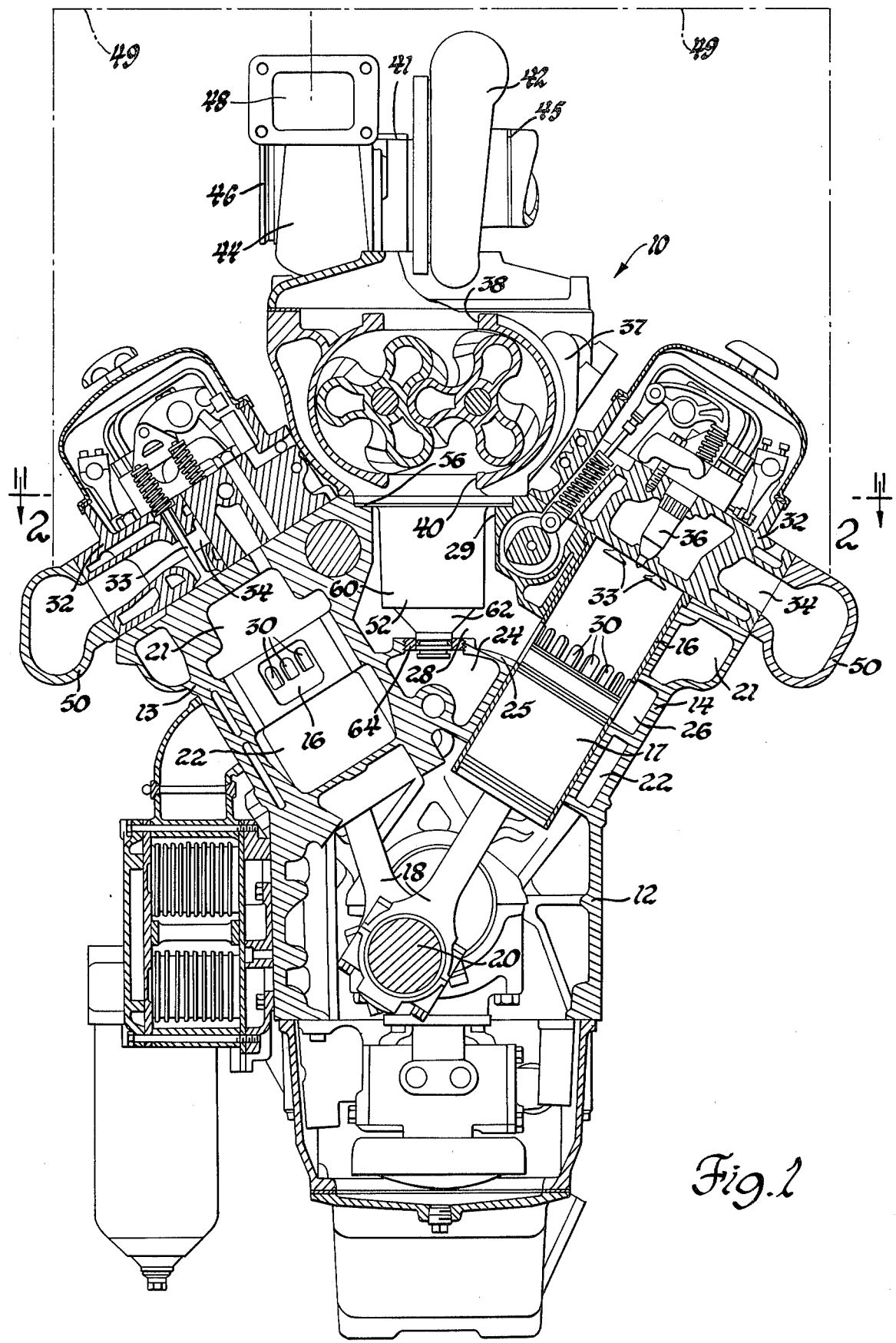
FIG. 1 is a transverse cross-sectional view of an engine having various features of the invention.
Figure 2:
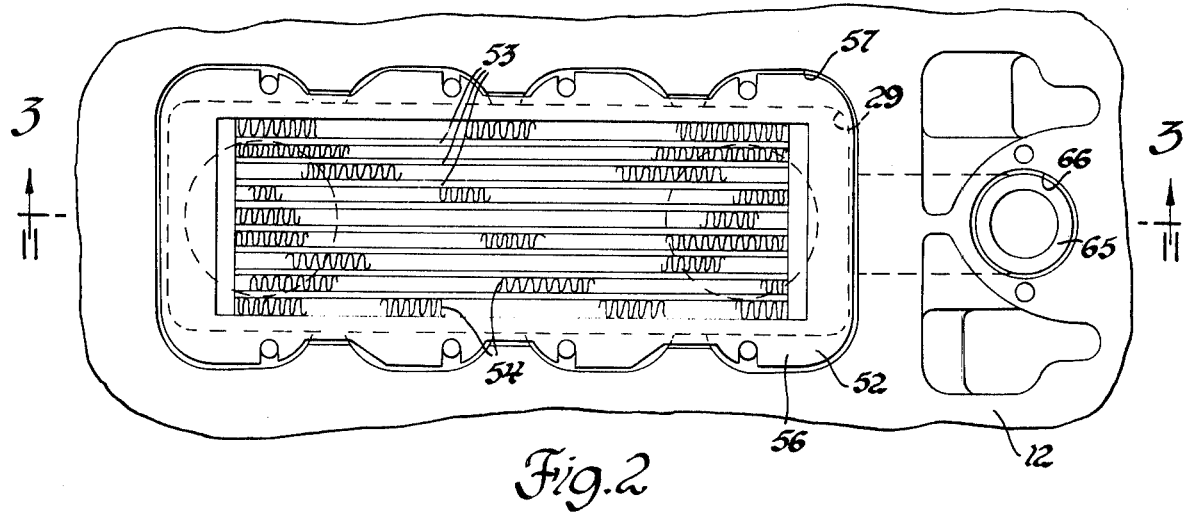
FIG. 2 is a cross-sectional view taken generally in the plane indicated by the line 2—2 of FIG. 1 and illustrating the placement of the aftercooler within the engine cylinder block.
Figure 3:
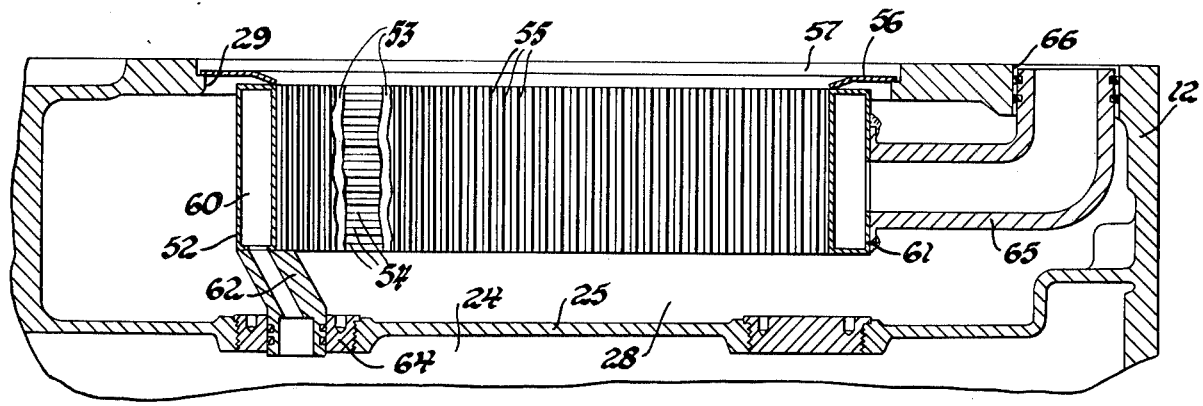
FIG. 3 is a longitudinal cross-sectional view taken generally in the plane indicated by the line 3—3 of FIG. 2 and further illustrating the placement of the engine aftercooler.

Referring first to FIGS. 1-3 of the drawings, there is represented an engine, generally indicated by numeral 10, of the multi-cylinder two-cycle diesel type. Engine 10 includes a cast cylinder block 12 having a pair of cylinder banks 13, 14 arranged in a V, each bank being provided with a plurality of longitudinally aligned cylinders 16. A plurality of pistons 17 are reciprocably disposed one in each cylinder and connect through connecting rods 18 with a crankshaft 20 rotatably supported in conventional fashion in a lower portion of the block 12.

The cylinder block further defines upper and lower coolant jackets 21, 22 which respectively extend around the upper and lower portions of the cylinders and are interconnected for coolant flow therebetween. The central portion of the lower coolant jacket 22 extends between the cylinder banks to form a longitudinally extending central chamber 24, closed by an upper wall 25. The cylinder block also defines an inlet air chamber or air box 26, portions of which extend around the centers of each of the cylinders between the upper and lower coolant jackets from an open central plenum 28 which extends above wall 25 of the lower coolant jacket to an opening 29 in the top of the cylinder block between the two cylinder banks. Ports 30 are provided around the central portions of the cylinders to permit the flow of air from the air box 26 as controlled by the motion of the pistons 17.

Each cylinder bank is provided with a cylinder head 32 mounted to close the upper ends of the cylinders of its respective bank and containing a plurality of exhaust valves 33, exhaust passages 34 controlled by the valves, and a fuel injector 36 for each cylinder. Actuation of the valves and injectors is conventionally controlled by valve gear operated in timed relation with the engine crankshaft.

A Roots type positive displacement blower 37 is centrally mounted on the cyliner block between the engine cylinder heads. Blower 37 has an inlet opening 38 in the upper portion of its housing and an outlet opening 40 in the lower portion of its housing and connecting with the air box inlet opening 29 of the cylinder block. A turbocharger 41 is also mounted on the engine by means, not shown, and includes a dynamic compressor portion 42 and a turbine portion 44. The compressor portion has an air inlet 45 adapted to be connected with an air source and an air outlet (not shown) connected with the inlet 38 of the Roots blower 37. The turbine portion includes an outlet 46 and an inlet 48 connected by suitable conduit 49 with exhaust manifolds 50 mounted on the engine cylinder heads and connecting with the exhaust passages 34 thereof.

Within the central plenum 28 of the engine air box there is received an aftercooler 52. As is best shown in FIGS. 2 and 3, the aftercooler consists of a heat exchanger having longitudinally extending plates or tubes 53 with internal fins 54 forming longitudinal passages for carrying liquid coolant and vertically extending fins 55 contacting the tubes and forming vertical airflow passages adjacent and between the tubes. The aftercooler core is supported within the cylinder block by a flange 56 secured within a recess 57 provided around the edge of the air box inlet opening 29. The upper and lower ends of the vertical passages defined by the fins 55 are open so that air delivered by the blower passes through the vertical passages and directly into the central plenum 28 of the air box 26.

These vertical airflow passages are sized to provide a total cross-sectional area no greater than the area of the blower outlet 40. Thus the cooler provides a slight restriction to airflow from the blower 37. Also, air velocity through the cooler is maintained high enough to maintain high heat transfer and efficiency levels and prevent the collection of deposits of carbon or other particles that might plug the passages. Further, the lower ends of the passages terminate close enough to the bottom wall 25 of the air box, which is the upper wall of the lower coolant chamber, to require air leaving the cooler to scrub the surface of wall 25, adding to the cooling effect. The air is then directed rapidly outwardly, acting as a deterrent to the back flow of particles from the cylinder air ports with their pulsating flow.

The front and rear ends of the cooler are provided with headers 60, 61 with which the opposite ends of the longitudinally extending coolant tubes 53 connect. Header 60 connects with the central chamber 24 of the lower engine coolant jacket through an attached inlet fitting 62 which extends through a sealed opening in a plug 64 provided in the upper wall 25. An outlet fitting 65 is mounted on header 61 and curves upwardly through an outlet opening 66 in the cylinder block upper wall, from which connection is made with external portions of the engine cooling system (not shown).

Figure 4:
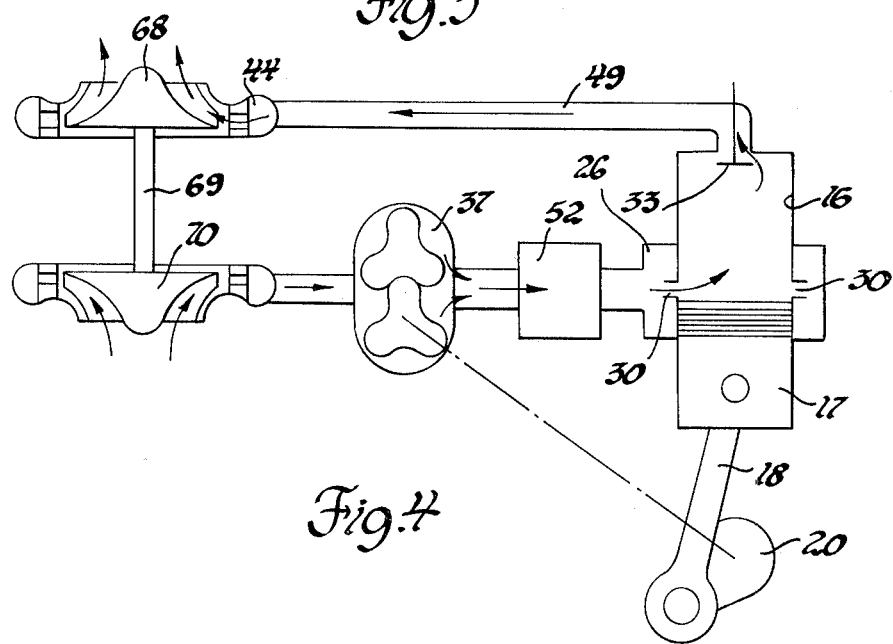
FIG. 4 is a schematic diagram illustrating the airflow path through the various components of the engine induction system.

FIG. 4 of the drawings shows schematically the relationship and operation of certain portions of the engine shown in FIGS. 1-3. Rotation of the crankshaft 20 reciprocates the pistons 17 in the cylinders 16 and drives the Roots blower 37 at a speed proportional to engine speed. This causes inlet air to be delivered through the after-cooler 52 and air box 26 to the cylinder inlet ports 30 where it enters the cylinder when its respective piston approaches the bottom dead center position. At the same time the exhaust valves 33 are opened, allowing exhaust gases to pass through the exhaust conduit 49 to the turbocharger turbine portion 44 where they drive a turbine wheel 68. The turbine wheel is connected through a shaft 69 to drive a conventional dynamic compressor wheel 70, mounted within the compressor portion of the turbocharger, thereby causing air to be drawn into the system and compressed for delivery to the Roots blower 37.

Engine operation further acts through means (not shown) to circulate liquid coolant through the engine cooling system. Some of the coolant passes into the lower coolant jacket 24 from which it is delivered through fitting 62 and header 60 to the longitudinal coolant tubes 53, passing through the tubes to header 61 and out through fitting 65. The passage of the coolant through the tubes in heat exchange relation with the vertical air passages defined by the fins 55 draws some of the heat from the pressurized air delivered to the engine by the turbocharger and Roots blower, thereby increasing the density of the air supplied to the cylinders while lowering its temperature.

Figure 5:
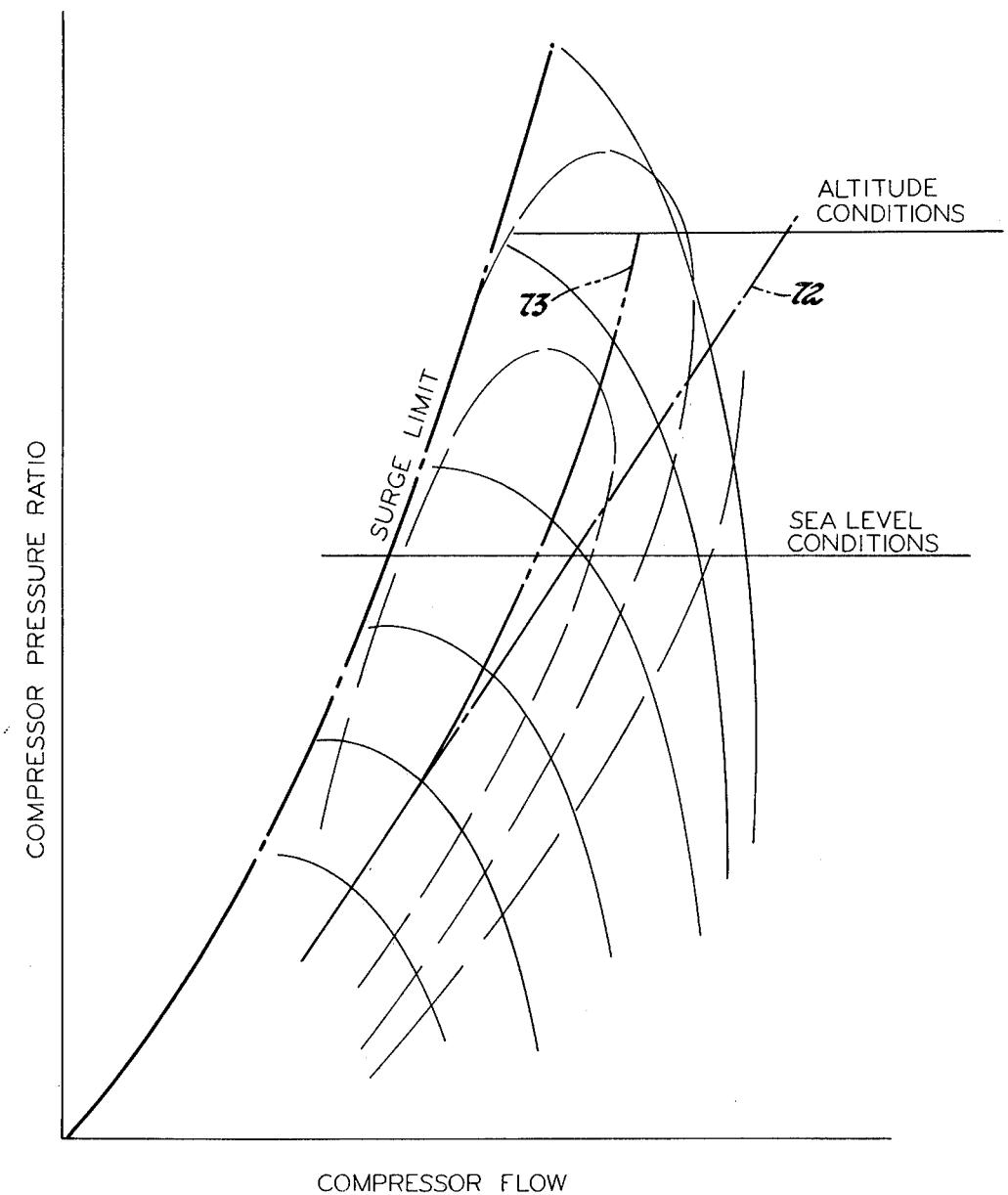
FIG. 5 is a compressor flow map showing the effects on the compressor operating line of the system with and without the aftercooler installed.

FIG. 5 shows a compressor flow map for the turbocharger compressor of the disclosed engine and showing the relationship of compressor pressure ratio to airflow therethrough. Plotted on this map are the compressor operating lines for operation at various pressure ratios both with a conventional non-aftercooled system, as indicated by line 72, and with an aftercooled system according to this invention, as indicated by line 73. It may be seen that the line 73 extends almost parallel to the surge limit line and within the more efficient operating zone of the compressor while the line 72 of the non-aftercooled system moves away from the surge limit as compressor pressure ratio is increased and into a generally less efficient operating range. The addition of the aftercooler to the system thus has the effect of reducing somewhat compressor airflow under higher pressure ratio conditions, but this reduction is effective to move the compressor into a more efficient operating range, thereby increasing engine efficiency while at the same time reducing somewhat airflow through the engine. The latter result reduces the excess air pumped through the system and leaves a denser air charge of greater mass within the cylinders with a lower initial temperature, as a result, combustion temperatures and the formation of nitrogen oxide emissions are reduced. In addition, the operating temperatures of the engine pistons and cylinders are reduced when operating at the same power levels.

Location of the aftercooler 52 within the air box provides a very compact and efficient arrangement with minimum added piping or passage length required for the flow of air and coolant, thereby minimizing losses from these sources. In addition, the advantages obtained by placing the aftercooler between the Roots blower and the engine cylinders are significantly greater than would result from placing an aftercooler directly after the turbocharger in the manner found in the prior art.

While the invention has been disclosed by reference to a preferred specific embodiment of the invention, it is recognized that numerous changes could be made within the scope of the inventive concepts disclosed. Accordingly, it is intended that the invention not be limited to the arrangement disclosed but that it have the full scope permitted by the language of the following claims.

What is claimed is:

1. A two-cycle diesel engine including a cylinder block,
a plurality of cylinders in said block arranged in two angularly disposed banks, said cylinders having air inlet ports intermediate the ends thereof, said block defining an air chamber adjacent said inlet ports and extending around said cylinders and between said banks above a bottom wall, and a coolant chamber extending around said cylinders and beneath said air chamber bottom wall between said cylinders,
cylinder heads mounted one on each of said banks and closing the ends of said cylinders, said heads having valve controlled exhaust ports connecting with each of said cylinders,
a crankshaft carried for rotation in said cylinder block,
pistons reciprocably disposed in said cylinders and connected with said crankshaft for delivery of power thereto,
a positive displacement blower mounted on said block between said heads and connected with said crankshaft for rotation therewith, said blower having an outlet connected to deliver air directly to said block defined air chamber and operative to supply air thereto upon rotation of said crankshaft,
a turbocharger including a turbine connected with said exhaust ports and a dynamic compressor driven by said turbine and connected to supply pressurized air to said positive displacement blower, and the improvement comprising
an aftercooler mounted in said block beneath said blower at its outlet and within said air chamber to receive air from said blower, said aftercooler being connected with said coolant chamber to receive engine coolant therefrom to cool the air passing from said blower to said air chamber, said aftercooler including a plurality of airflow passages and a plurality of coolant passages arranged in heat exchange relation with said air passages, said airflow passages having a total cross-sectional area not greater than that of said blower outlet so as to provide a high airflow velocity in said air passages to obtain efficient heat transfer and avoid plugging, said air passages being directed toward said bottom wall and terminating thereabove such that the outlet air is directed against said bottom wall for further cooling and then outwardly toward said cylinders, the space between said bottom wall and the ends of said aftercooler passages being small enough to maintain an airflow velocity in said space adequate to prevent pressure pulsations at the cylinder ports from causing flow reversals in the portion of the air chamber under the cooler, thereby avoiding backflow of carbon and other foreign matter from the cylinders to the aftercooler.

* * * * *

UNITED STATES PATENT AND TRADEMARK OFFICE
CERTIFICATE OF CORRECTION

PATENT NO. : 4,028,892
DATED : June 14, 1977
INVENTOR(S) : Stanley J. Hinkle

It is certified that error appears in the above-identified patent and that said Letters Patent are hereby corrected as shown below:

Column 2, line 9, "circuit" should read --outlet--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks